United States Patent
Pandit et al.

(10) Patent No.: US 11,645,726 B2
(45) Date of Patent: May 9, 2023

(54) GENERATING CONSTRAINTS BASED ON REPORTED CROP ARRIVALS TO MARKETPLACES AND REMOTE SENSED DATA TO ESTIMATE FARM YIELDS OF FARM FIELDS

(71) Applicant: INTERNATIONAL BUSINESS MACHINES CORPORATION, Armonk, NY (US)

(72) Inventors: Sushain Pandit, Austin, TX (US); Smitkumar Narotambhai Marvaniya, Bangalore (IN); Mohit Jain, Bengaluru (IN); Wesley Richards, Pflugerville, TX (US); Dean Daskalantonakis, Austin, TX (US); Jagabondhu Hazra, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 312 days.

(21) Appl. No.: 16/864,149

(22) Filed: Apr. 30, 2020

(65) Prior Publication Data

US 2021/0342953 A1 Nov. 4, 2021

(51) Int. Cl.
*G06Q 50/02* (2012.01)
*G06F 16/587* (2019.01)
(Continued)

(52) U.S. Cl.
CPC .......... *G06Q 50/02* (2013.01); *G06F 16/587* (2019.01); *G06Q 10/04* (2013.01);
(Continued)

(58) Field of Classification Search
CPC .... G06Q 50/02; G06Q 10/04; G06Q 30/0205; G06Q 50/28; G06T 7/62;
(Continued)

(56) References Cited

U.S. PATENT DOCUMENTS 6,366,681 B1 * 4/2002 Hutchins ................ G06V 20/13
382/110
2015/0100358 A1 4/2015 Klavins
(Continued)

OTHER PUBLICATIONS

Ferencz, C., et al., "Crop Yield Estimation by Satellite Remote Sensing", Int. J. Remote Sensing, vol. 25, No. 20, Oct. 20, 2004, 38 pp.

(Continued)

*Primary Examiner* — Charles Guiliano
(74) *Attorney, Agent, or Firm* — Konrad Raynes Davda & Victor LLP; David W. Victor

(57) ABSTRACT

Provided are a computer program product, system, and method for generating constraints based on reported crop arrivals to marketplaces and remote sensed data to estimate farm yields of farm fields. A total arrival quantity constraint for a marketplace is generated comprising a function of a reported arrival of crops at a marketplace and an estimated arrival to the marketplace comprising a sum of farm yields for the farm fields, wherein the farm yields comprise variables to optimize. Sensed data of the farm fields is used to determine relationships of the farm yields for the farm fields. Comparative farm yield constraints are generated comprising relationships of the farm yields for different pairs of farms. A constraint optimization problem is solved based on the total arrival quantity constraint and comparative farm yield constraints to calculate the farm yields of the farm fields.

25 Claims, 8 Drawing Sheets

(51) Int. Cl.
  *G06Q 30/0204* (2023.01)
  *G06Q 50/28* (2012.01)
  *G06T 7/62* (2017.01)
  *G06Q 10/04* (2023.01)

(52) U.S. Cl.
  CPC ......... *G06Q 30/0205* (2013.01); *G06Q 50/28* (2013.01); *G06T 7/62* (2017.01); *G06T 2207/10032* (2013.01); *G06T 2207/30188* (2013.01)

(58) Field of Classification Search
  CPC . G06T 2207/10032; G06T 2207/30188; G06F 16/587
  USPC ....................................................... 705/7.39
  See application file for complete search history.

(56) References Cited

U.S. PATENT DOCUMENTS

| | | |
|---|---|---|
| 2018/0059691 A1 | 3/2018 | Fleming et al. |
| 2018/0330435 A1* | 11/2018 | Garg ................. G06Q 30/0283 |
| 2019/0325387 A1 | 10/2019 | Perry et al. |
| 2020/0005401 A1* | 1/2020 | Bull ................. G06Q 10/06315 |
| 2020/0265527 A1* | 8/2020 | Rose ...................... G06Q 50/02 |

OTHER PUBLICATIONS

Kondylis, F., "Measuring Yields from Space", [online], Feb. 11, 2015, [Retrieved on Apr. 30, 2020], Retrieved from the Internet at <URL: https://blogs.worldbank.org/impactevaluations/measuring-yields-space>, 12 pp.

Lobell, D.B., "The Use of Satellite Data for Crop Yield Gap Analysis", Field Crops Research, vol. 143, Mar. 1, 2013, 9 pp.

Prasad, G., et al., "Agriculture Commodity Arrival Prediction Using Remote Sensing Data: Insights and Beyond", arXiv:1906.07573v1; Jun. 14, 2019, 8 pp.

\* cited by examiner

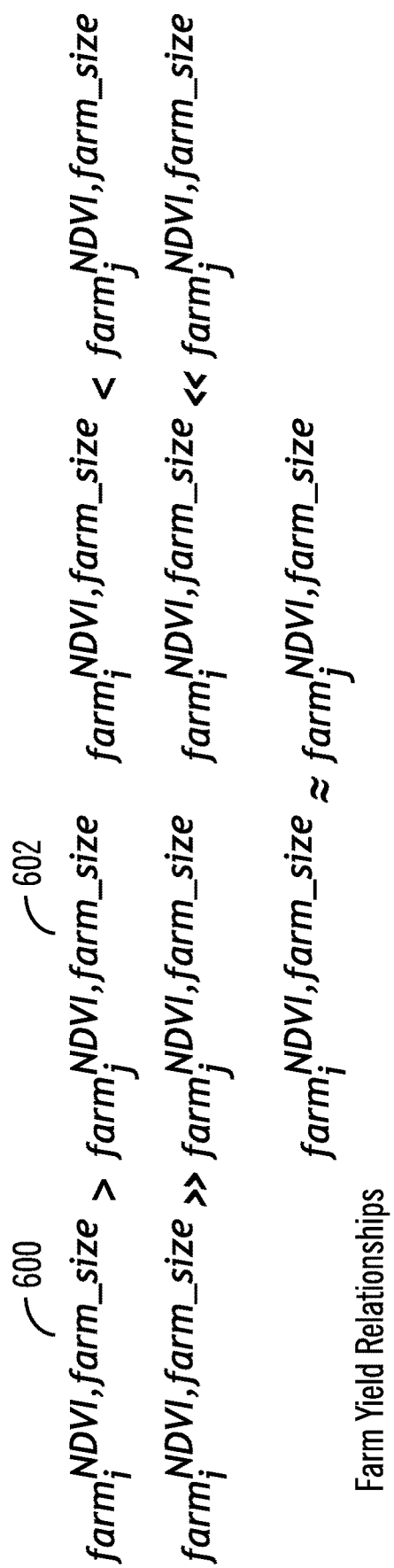

$$farm_i^{NDVI, farm\_size} > farm_j^{NDVI, farm\_size}$$
$$farm_i^{NDVI, farm\_size} >> farm_j^{NDVI, farm\_size}$$
$$farm_i^{NDVI, farm\_size} < farm_j^{NDVI, farm\_size}$$
$$farm_i^{NDVI, farm\_size} << farm_j^{NDVI, farm\_size}$$
$$farm_i^{NDVI, farm\_size} \approx farm_j^{NDVI, farm\_size}$$

Farm Yield Relationships

FIG. 6

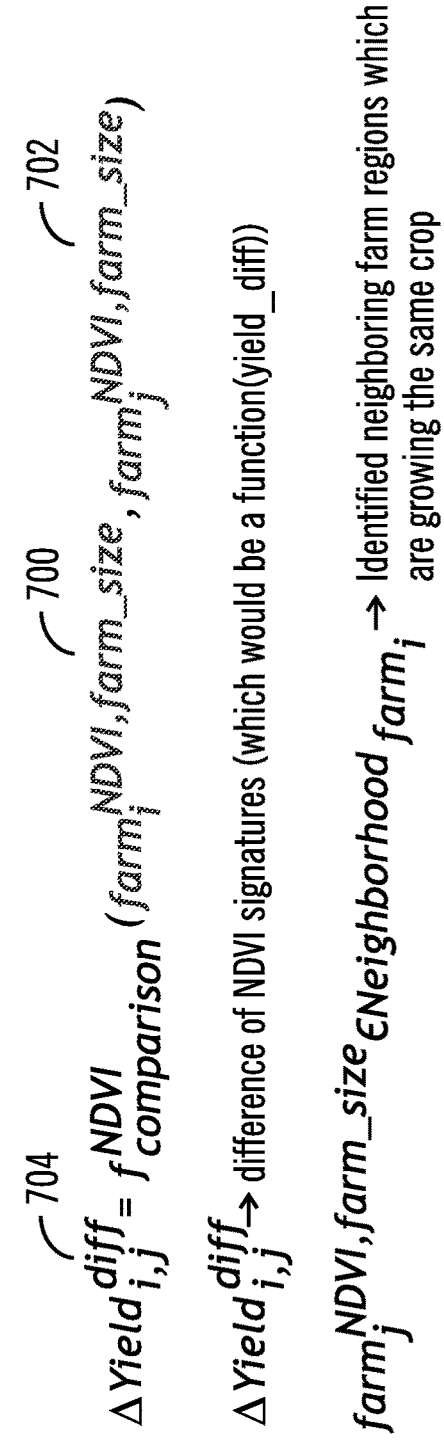

$$\Delta Yield_{i,j}^{diff} = f_{comparison}^{NDVI}(farm_i^{NDVI, farm\_size}, farm_j^{NDVI, farm\_size})$$

$\Delta Yield_{i,j}^{diff} \rightarrow$ difference of NDVI signatures (which would be a function(yield_diff))

$farm_j^{NDVI, farm\_size} \in Neighborhood_{farm_i} \rightarrow$ Identified neighboring farm regions which are growing the same crop Comparative Farm Yield Constraints

FIG. 7

$$TotalArrival^{Marketplace}_{crop\text{-}type} - TotalArrival^* | < \Delta^{crop\text{-}type}_{th}$$

$$TotalArrival^* = \sum_{k=1}^{N} w^{marketplace\,k}_{arrival} * \left| \sum_{i=1}^{n} (\sigma^{marketplace\,k}_{i} * w_i * farm\text{-}size * farm^{yield}_i) \right|$$

Total Arrival Quantity Constraint

FIG. 8

$$|Quantity^{arrival}_{date,marketplace} - Aggregated^{farm\text{-}level\text{-}yield}_{window\text{-}date,marketplace}| < \Delta^{yield}_{yield\_th}$$

Total Arrival Quantity Constraint $$Aggregated^{farm\text{-}level\text{-}yield}_{window\text{-}date,marketplace^k} = \sum_{i=1}^{n} Yield(farm^{yield}_i, farm\_size)$$

$$farm_i \in marketplace^k$$

FIG. 9

$$region^{agg\text{-}yield,area}_i > region^{agg\text{-}yield,area}_j \quad region^{agg\text{-}yield,area}_i \gg region^{agg\text{-}yield,area}_j$$

$$region^{agg\text{-}yield,area}_i < region^{agg\text{-}yield,area}_j \quad region^{agg\text{-}yield,area}_i \ll region^{agg\text{-}yield,area}_j$$

$$region^{agg\text{-}yield,area}_i \approx region^{agg\text{-}yield,area}_j$$

Region Yield Relationshp

FIG. 10

GENERATING CONSTRAINTS BASED ON REPORTED CROP ARRIVALS TO MARKETPLACES AND REMOTE SENSED DATA TO ESTIMATE FARM YIELDS OF FARM FIELDS

BACKGROUND OF THE INVENTION

1. Field of the Invention

The present invention relates to a computer program product, system, and method for generating constraints based on reported crop arrivals to marketplaces and remote sensed data to estimate farm yields of farm fields.

2. Description of the Related Art

Ground-truth yield data at a farm level is crucial for precision agriculture, price forecast and supply projections. However, actual farm yield data is often not available because growers are not incentivized to share their farm yield data in a consistent manner and the reporting may be inaccurate or incomplete. Given population dependency on agricultural output, governments need to have accurate farm field data to estimate any potential disruptions in advance to prepare for deviations in farm output. Further, governments need more accurate models to determine farm yield. Governments and private industry may use historical data and prediction variables of arrivals, prices, crop quality to determine farm yields and whether the determined farm yields are sufficient to maintain agricultural outputs at optimal levels.

One technique used to estimate crop yield is the Normalized Difference Vegetation Index (NDVI) which utilizes remote infrared sensing data to measure the health of vegetation in farm fields and the growth stage crops at the field level. Maps may be created that use different color schemes to represent the health of farm fields. This allows farmers, agronomists, and the governments to track the health of crops and growing conditions to determine whether government or private industry intervention is needed to maintain the price and supply of crops.

There is a need in the art for improved techniques for estimating farm yields in farm fields to improve agricultural forecasting.

SUMMARY

Provided are a computer program product, system, and method for generating constraints based on reported crop arrivals to marketplaces and remote sensed data to estimate farm yields of farm fields. A total arrival quantity constraint for a marketplace is generated comprising a function of a reported arrival of crops at a marketplace and an estimated arrival to the marketplace comprising a sum of farm yields for the farm fields, wherein the farm yields comprise variables to optimize. Sensed data of the farm fields is used to determine relationships of the farm yields for the farm fields. Comparative farm yield constraints are generated comprising relationships of the farm yields for different pairs of farms. A constraint optimization problem is solved based on the total arrival quantity constraint and comparative farm yield constraints to calculate the farm yields of the farm fields. The farm yields for the farm fields are stored in a storage.

With the above embodiment, farm yields may be determined not from historical data, but instead from current crops reported as delivered to marketplaces and based on relationships of farm and regional yields based on other gathered information, such as remote sensed data, e.g., NVDI data, satellite images, weather patterns, soil conditions, water table, etc. In this way, the farm yields, for which data often is not directly available, may be estimated based on reported marketplace crop arrivals, which information is typically real time, accurate and available.

In a further embodiment, the total arrival quantity constraint comprises a function of difference of the reported arrival of crops at the marketplace and the estimated arrival to the marketplace less than a pre-determined yield differential.

With the above embodiment, the total arrival quantity constraint is based on calculating the farm yield to ensure a difference of the reported arrival of crops and the estimated arrival, which uses the estimated farm yield variable being optimized, is within an accepted differential to ensure accuracy based on reported data.

In a further embodiment, for each farm field of the farm fields and for each marketplace of a plurality of marketplaces, a determination is made of a delivery probability of the farm field delivering at least one crop to the marketplace. The estimated arrival at the marketplace comprises a sum of, for each farm field delivering to the marketplace, the farm yield times the delivery probability for the farm field to deliver to the marketplace.

With the above embodiment, to further improve the accuracy of the farm yield estimate, a delivery probability is calculated based on the probability of a farm delivering to a marketplace. This ensures that the farm yield variable is not understated due to a certain amount of the farm yield at a marketplace not being delivered to a marketplace.

In a further embodiment, satellite images of a geographical region are processed to determine boundaries of farm fields and farm sizes. For each of the farm fields, a determination is made, from the sensed data, of a crop growth stage. For each farm field, a determination is made of farm fields within a predetermined distance growing similar crops. For each pair of the determined farm fields within the predetermined distance growing the similar crops, a determination is made of a farm yield relationship for the pair of farm yields based on the farm sizes and growth stages for the pair of farm fields. A comparative farm yield constraint is generated for each determined farm yield relationship to specify a relationship in the farm yield relationship for the farm yields.

With the above embodiments, an additional comparative farm yield constraint is provided based on expected relationships of farm yields from farm fields for pairs of farm fields within a predetermined distance. This comparative farm yield constraint optimizes the estimated farm yield variable to ensure they satisfy predetermined relationships of farm yields between farm yields to ensure that farm yields maintain expected relative farm yields with respect to other farm fields within a predetermined distance.

In a further embodiment, a determination is made of relationships of region aggregate yields for regions. The relationships are determined based on at least one of historical region level data, ground level water condition in the region, canal facilities in the region, soil conditions in the region, and weather conditions in the regions. Region yield constraints are generated that indicate relationships of pairs of region aggregate yields of farm fields in a region. Each region aggregate yield in a constraint is calculated as a sum of the farm yields of the farm fields in the region. The solving the constraint optimization problem for the farm yields to optimize is based on the total arrival quantity constraint for marketplaces, the comparative farm yield constraints, and the region yield constraints to calculate the farm yield of the farm fields.

With the above embodiment, the farm yield values also must satisfy constraints of relationships between regions, so that the sum of farm yields within two regions must satisfy relationship constraints between regions. This provides further accuracy by ensuring that the farm yield values that are calculated conform to region relationships based on relevant factors that influence farm yield, such as historical region level data, ground level water condition in the region, canal facilities in the region, soil conditions in the region, and weather conditions in the regions.

In an additional embodiment of a computer program product, method and system for calculating farm yield data, a crop total arrival quantity to all marketplaces constraint is generated comprising a relationship of a reported arrival of crops to the marketplaces and an estimated arrivals to the marketplaces from the farm fields. The estimated arrivals to the marketplaces is calculated as a sum of estimated arrivals to a marketplace for each the marketplaces. The sum of estimated arrivals to a marketplace is a sum of, for each farm field, the farm yield times a delivery probability the farm field delivers crops to the marketplace. A constraint optimization problem is solved based on the crop total arrival quantity to all marketplaces constraints. A report including the farm yields for the farm fields is stored in storage.

With the above embodiment, the farm yield variable is optimized to satisfy constraint of a crop total quantity arrival to all marketplaces to ensure that a reported arrival of all crops to marketplaces and the estimated arrivals, based on the farm yield variables to optimize, are within a yield differential to ensure accuracy.

In a further embodiment, the relationship of the reported arrival of crops to the marketplaces and the estimated arrivals to the marketplaces from the farm fields comprises an estimated differential of an absolute value of a difference of the reported arrival of crops to the marketplaces and the estimated arrivals to the marketplaces from the farm fields.

In a further embodiment, the sum of estimated arrivals to a marketplace for each marketplace is multiplied by an arrival weight for the marketplace indicating an estimated percentage of crops that arrives at the marketplace from the farm fields.

With the above embodiment, to improve accuracy of the constraint, an arrival weight is applied to farm yields sent to a marketplace because not all of the farm yield variable to estimate is sent to the marketplace. In this way, the farm yield value is not underestimated by assuming all its quantity arrives at the marketplace.

BRIEF DESCRIPTION OF THE DRAWINGS

FIG. 6 illustrates an example of farm yield relationships.

FIG. 7 illustrates an example of comparative farm yield constraints.

FIGS. 8 and 9 illustrate examples of total arrival quantity constraints.

FIG. 10 illustrates an example region yield relationships.

DETAILED DESCRIPTION

Described embodiments provide improvements to computer technology for estimating farm yield data at the farm level using marketplace arrival data and remote sensed data, such as NVDI data. Described embodiments provide technology for gathering remote sensed data and processing current marketplace data to provide improved techniques for estimating current farm yields. Crop harvests from farm fields can be sent to one or more marketplaces nearby. Described embodiments determine a likelihood of sending the harvest of farm field to a marketplace based on multiple constraints, such as transportation cost, marketplace price, etc. The described embodiments consider the reported arrival of crops at the marketplaces to determine which farms have been harvested up to that point in time. Described embodiments determine farm size and comparative farm yield constraints to approximate the farm yield quantity at farm fields by solving constraint optimization.

Figure 1:
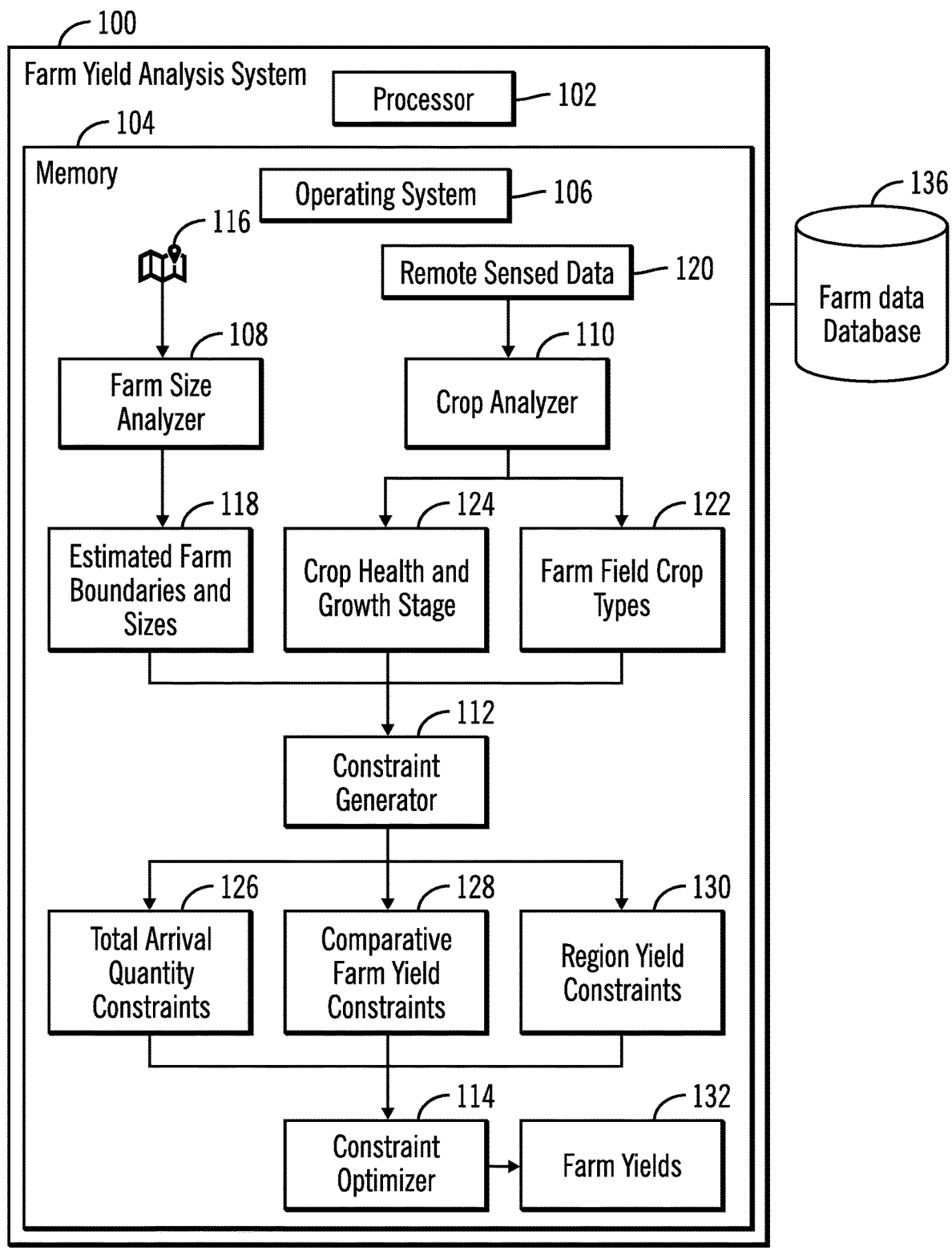
FIG. 1 illustrates an embodiment of a farm yield analysis system.

FIG. 1 illustrates an embodiment of a farm yield analysis system 100 in which embodiments are implemented. The farm yield analysis system 100 includes a processor 102 and a main memory 104. The main memory 104 includes various program components including an operating system 106, a farm size analyzer 108, a crop analyzer 110, a constraint generator 112, and a constraint optimizer 114 to generate farm fields.

The farm size analyzer 108 comprises a computer program that receives satellite images 116 and processes the satellite images 116 to determine farm boundaries and sizes 118. The crop analyzer 110 receives remote sensed data 120, such as Normalized Difference Vegetation Index (NDVI) data or other types of data, that indicates health of crops and vegetation based on how crops reflect light at specific frequencies, including crop phenology, such as stage of growth. The crop analyzer 110 may determine from the remote sensed data 120 for the farm fields, crop types 122 and crop health and growth stage 124 from the remote sensed data 120. The constraint generator 112 receives the estimated farm boundaries and sizes 118, farm field crop types 122, and crop health and growth stage 124 and generates different constraints on which the farm yields are calculated, including total arrival quantity constraints 126 of the variable farm fields with respect to arrival of crops at each of the marketplaces; comparative farm yield constraints 128 that express farm yield relationships of pairs of farm fields within a predetermined distance of each other; and region yield constraints 130 of the variable farm fields with respect to arrival of different crop types at the marketplaces.

The constraint optimizer 114 receives the different constraints 126, 128, and 130 and optimizes a solution for the farm yields 132 that satisfies the constraints 126, 128, and 130. In one embodiment, the constraint optimizer 114 may determine the farm yields by solving a constraint optimization problem using quadratic programming. The gathered information on farm fields, including estimated farm sizes 118, crop type 122, crop health and growth stage 124, and the calculated farm yields 132 may be saved in the farm data database 136 for future calculations of the farm yields and use.

The memory 104 may comprise suitable volatile or non-volatile memory devices.

Generally, program modules, such as the program components 106, 108, 110, 112, 114 may comprise routines, programs, objects, components, logic, data structures, and so on that perform particular tasks or implement particular abstract data types. The program components and hardware devices of the farm yield analysis system 100 of FIG. 1 may be implemented in one or more computer systems, where if they are implemented in multiple computer systems, then the computer systems may communicate over a network.

The program components 106, 108, 110, 112, 114 may be accessed by the processor 102 from the memory 104 to execute. Alternatively, some or all of the program components 106, 108, 110, 112, 114 may be implemented in separate hardware devices, such as Application Specific Integrated Circuit (ASIC) hardware devices.

The functions described as performed by the programs 106, 108, 110, 112, 114 may be implemented as program code in fewer program modules than shown or implemented as program code throughout a greater number of program modules than shown.

The arrows shown in FIG. 1 between the components 108-132 represent a data flow between the components.

Information, such as the satellite image 116 and remote sensed data 120, may be received through a network, Internet, satellite transmissions, and other communication channels.

Figure 2:
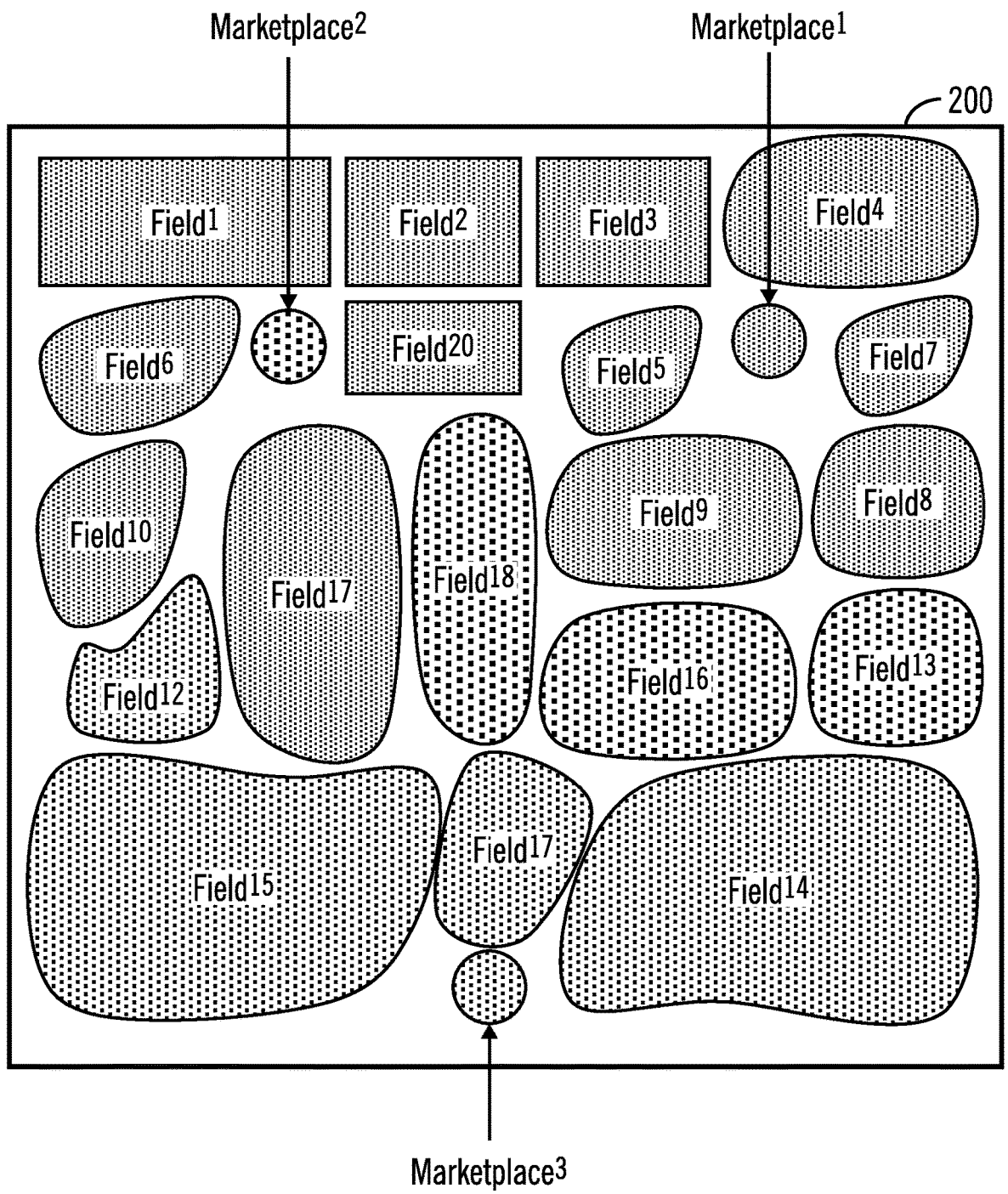
FIG. 2 illustrates an embodiment of boundaries of farm fields and marketplaces in an area.

FIG. 2 illustrates an example of farm fields that may be determined by the farm size analyzer 108 and marketplaces to which the farm fields send their crops. The fields are represented in different shading and patterns that represent the marketplace having the same color to which the crops from the fields are sent.

Figure 3:
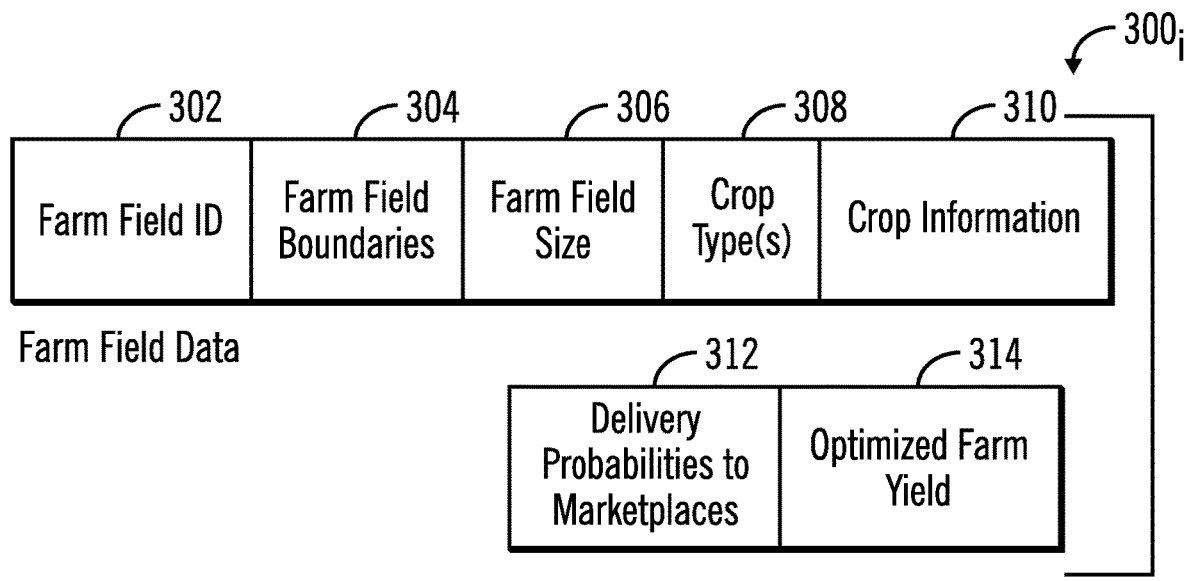
FIG. 3 illustrates an embodiment of farm field data used to estimate farm yields for farm fields.

FIG. 3 illustrates an embodiment of farm field data 300i gathered for a farm field from the farm size analyzer 108 and crop analyzer 110, and stored in the farm data database 136, and includes an identifier 302 of a farm field determined from the farm size analyzer 108 from the satellite image 116; farm field boundaries 304, such as longitude and latitude of the farm field 302 identified by the farm size analyzer 108; a farm field size 306 determined by the farm size analyzer 108; one or more crop types 308 identified by the crop analyzer 110 from the remote sensing data, such as by applying a crop mask to the satellite image 116; crop information 310, such as crop health and stage of growth, e.g., NVDI information; delivery probabilities 312 of the farm field 302 to have its crop delivered to different marketplaces, which may be determined from transportation cost, distance to marketplace, marketplace price, etc.; and the calculated optimized farm yield 314 for the farm field 302 produced by the constraint optimizer 114 as farm yields 132.

Figure 4:
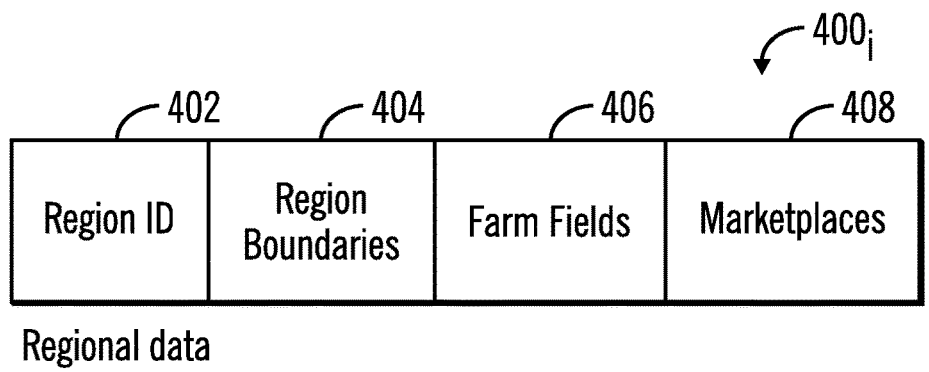
FIG. 4 illustrates an embodiment of region data used to generate region yield constraints to optimize estimation of farm yields.

FIG. 4 illustrates an embodiment of an instance of regional data 400, that is maintained to use to calculate the region yield constraints 130, and includes: a region identifier (ID) 402 identifying a region; region boundaries 404 comprising longitude and latitude of the region including the region 402; farm fields 406 in the region 402; and marketplaces 408 in the region 402.

Figure 5:
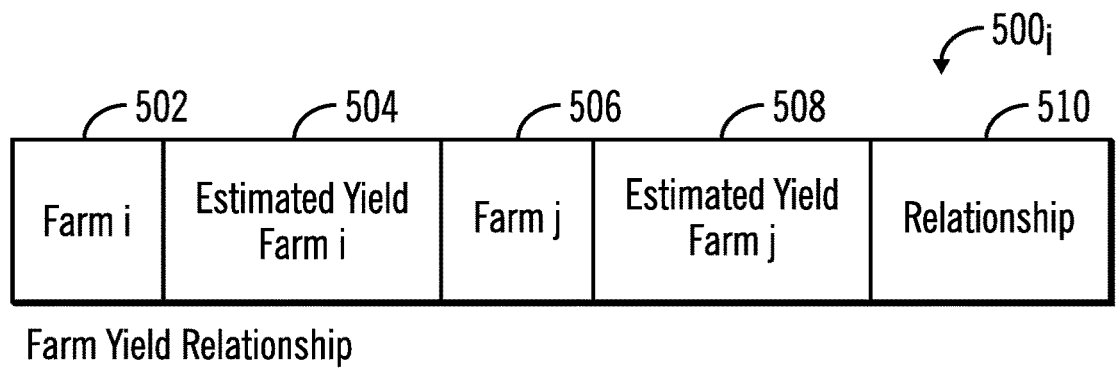
FIG. 5 illustrates an embodiment of farm yield relationship information between pairs of farm fields used to generate comparative farm yield constraints.

FIG. 5 illustrates an embodiment of an instance of farm yield relationships $500_i$ for a pair of farm field i 502 and farm field j 506, including the estimated yield for farm i 504 and farm j 408, which may be estimated from the farm field size 118 and crop health and growth stage 124 for the farm field. The relationship 510 indicates a relationship between the estimated yields 504, 506, which may be a comparison operator, e.g., less than, greater than, equal, etc., or a yield differential between the two estimated yields 504, 508. The farm yield relationships 500 are used to generate the comparative farm yield constraints 128 comprising a function including the farm yield variables to optimize in the relationship 510.

FIG. 6 illustrates an example of expressions of the farm yield relationships $500_i$, where the estimated farm yields, estimated from the remote sensed data, such as NVDI, are shown as estimated farm yields 600 and 602. The different possible relationships between the estimated farm yields are shown as comparator operators $>, \gg, <, \ll, \approx$.

FIG. 7 illustrates an example of expressions of the farm yield relationships $500_i$, where the estimated farm yields, estimated from the remote sensed data, such as NVDI, are shown as estimated farm yield 700 and 702. The relationship between the estimated farm yields are shown as a yield differential value 704 as opposed to a comparator. The yield differential is determined as a difference of the estimated farm yields 700, 702, also referred to as an NDVI signature.

The comparative farm yield constraints 128 are derived from the farm yield relationships shown in FIGS. 6 and 7, and the estimated farm yields 600, 602, 700, 702 are replaced by the farm yield variables to calculate.

FIG. 8 illustrates an embodiment of total arrival quantity constraint 126 as equation 800, where the TotalArrival (Marketplace crop-type) 802 is the total arrival of a crop type at all marketplaces, which may be determined from reported marketplace exchange data, the TotalArrival*804 is the calculated total arrival of a crop type at all marketplaces having the field yield variables to optimize, and the crop type differential 806 is the expected differential between the TotalArrival 802 minus the TotalArrival*804. The differential may be based on previous estimations or calculations.

The TotalArrival*804 comprises a sum across all marketplaces N of, for each marketplace k, of a marketplace arrival percentage (w) 808 comprising a percentage of crops that arrive at the marketplace k from the farm fields delivering crops to the marketplace k times the estimated arrival at the marketplace k 810. The estimated arrival at the marketplace k 810 comprises the sum, for each farm field i delivering to marketplace k, of (the delivery probability $(\sigma_i)$ 812 of farm field i delivering its product to marketplace k) times a marketplace arrival weight for farm field i $(w_i)$ 814, which is a function of the farm field i size) times (the farm yield (farm i(yield)) for farm field i 816), where the farm yield 816 comprises the variable to optimize.

In FIG. 8, the total arrival quantity restraint 800 is expressed for the arrival of a specific crop type at all the marketplaces, which requires farm yield to be broken up by crop type. In an alternative embodiment, the total arrival quantity constraints 126 may be for all crop types delivered to the marketplaces, and not specific to a crop type.

FIG. 9 illustrates an embodiment of total arrival quantity constraint 126 as equation 900 as the absolute value of a difference of a reported arrival of crops (for all crop types) at a marketplace on a date (Quantity(arrival date, marketplace) 902 and an estimated arrival to the marketplace 904

(Aggregated(farm-level-yield window-date, region) which is less than a predetermined yield differential 906 based on empirical data.

The estimated arrival at the marketplace k 904 comprises a sum of the farm yields i 908 for all the farm fields n delivering crops to the marketplace k. The farm yield 908 is a function of a farm i yield per unit of farm size 910 times the farm size 912. Optimization may be on the yield 908 or the farm i yield per unit of farm size 910.

With the embodiments of FIGS. 8 and 9, total arrival quantity constraints 126 are based on arrival across all marketplaces for a crop type (as in FIG. 8) and/or arrival to each marketplace across all crop types (FIG. 9). The more varieties of constraints the greater the accuracy of the estimate of the farm yield variables through constraint optimization.

FIG. 10 illustrates an embodiment of region yield constraints 130 as relationships, such as 1000, between different regions i 1002 and region j 1004, where the relationship is expressed as a comparator operator. These region yield constraints are used by substituting in the sum of farm yields from all farm yields in a region for the regions shown in FIG. 10. The region yield relationships may be determined based on historical region level data, ground level water condition in the region, canal facilities in the region, soil conditions in the region, and weather conditions in the regions.

Figure 11:
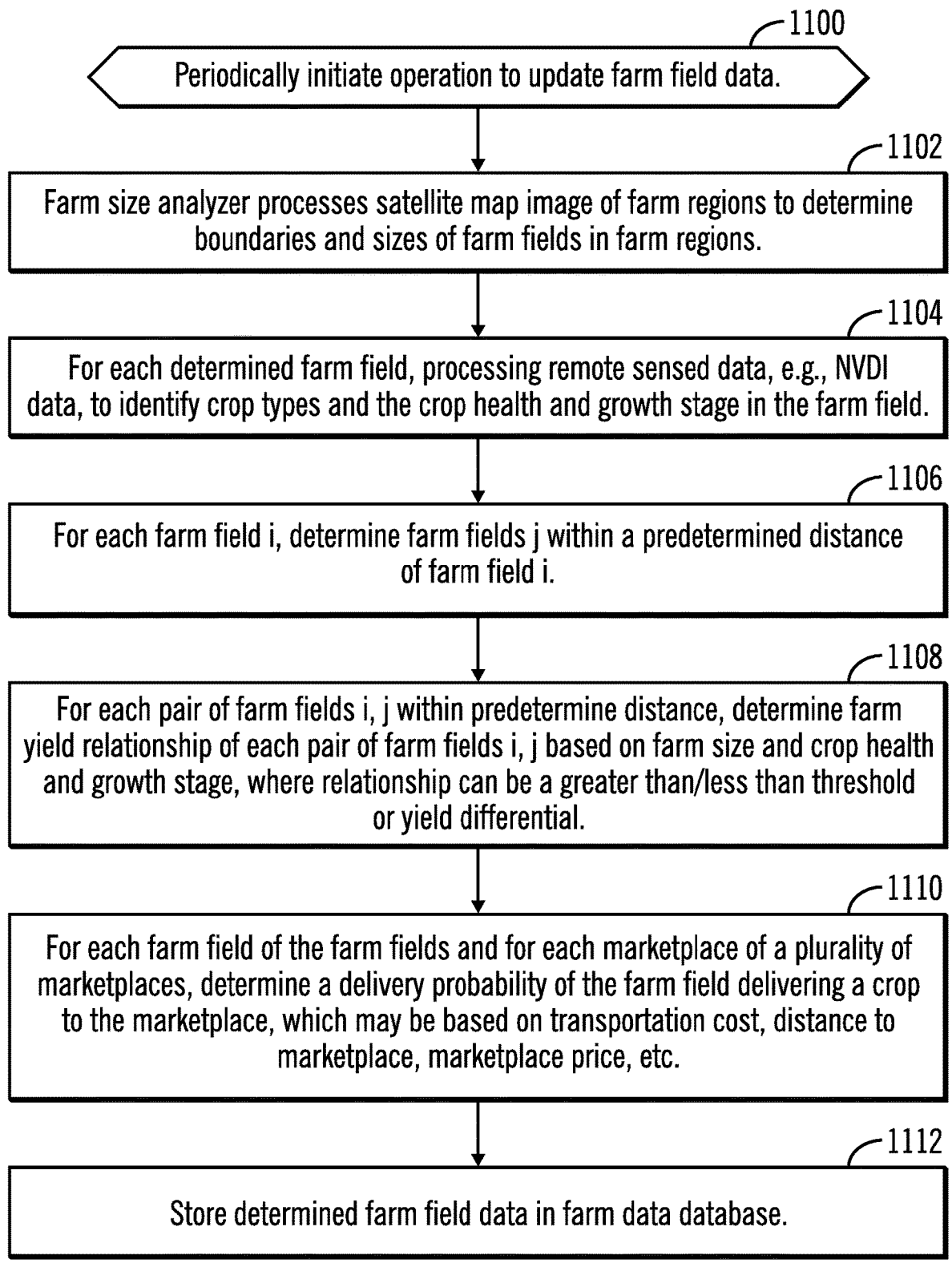
FIG. 11 illustrates an embodiment of operations to update farm field data.

FIG. 11 illustrates an embodiment of operations performed by the farm size analyzer 108 and the crop analyzer 110, or other components, to update information on farm fields in regions for which farm yields are being analyzed. Upon periodically initiating (at block 1100) operations to update the farm field data $300_i$, the farm size analyzer 108 processes a satellite image 116 of farm regions to determine boundaries and sizes of farm fields in farm regions 118. For each determined farm field, the crop analyzer 110 processes remote sensed data 120, e.g., NVDI data, to identify crop types 122 and the crop health and growth stage 124. For each farm field i, the crop analyzer 110 may determine (at block 1106) farm fields j within a predetermined distance from farm field i. For each pair of farm fields i, j within a predetermine distance, the crop analyzer 110 determines (at block 1108) farm yield relationship 500i of each pair of farm fields i, j based on farm size 118 and crop health and growth stage 124, where the relationship 510 can be a greater than/less than threshold or yield differential. The estimated crop yield 504, 508, on which the relationship 510 is based, may be based on a function of farm size, crop health and growth stage, and other relevant data, such as weather, water table, historical yield data, etc.

For each farm field of the farm fields and for each marketplace of a plurality of marketplaces, the crop analyzer 110 or other component may determine (at block 1110) a delivery probability 312 of the farm field delivering a crop to the marketplace, which may be based on transportation cost, distance to marketplace, marketplace price, etc. The determined farm field data $300_i$ may be stored (at block 1112) in the farm data database 136.

With the embodiment of FIG. 11, information on current farm fields and crop conditions may be gathered for use in determining current farm yields. The gathered data, such as estimated farm boundaries and sizes 118, farm field crop types 122, and crop health and growth stages 124 may then be used to determine current relationships of yield or output from the determined farm fields. All this gathered information may then be used to generate the constraints 126, 128, 130 used for the constraint optimization for determining farm yields. This allows for real time data and farm crop conditions to be used to provide accurate current farm information that may then be used to calculate the farm field yields.

Figure 12:
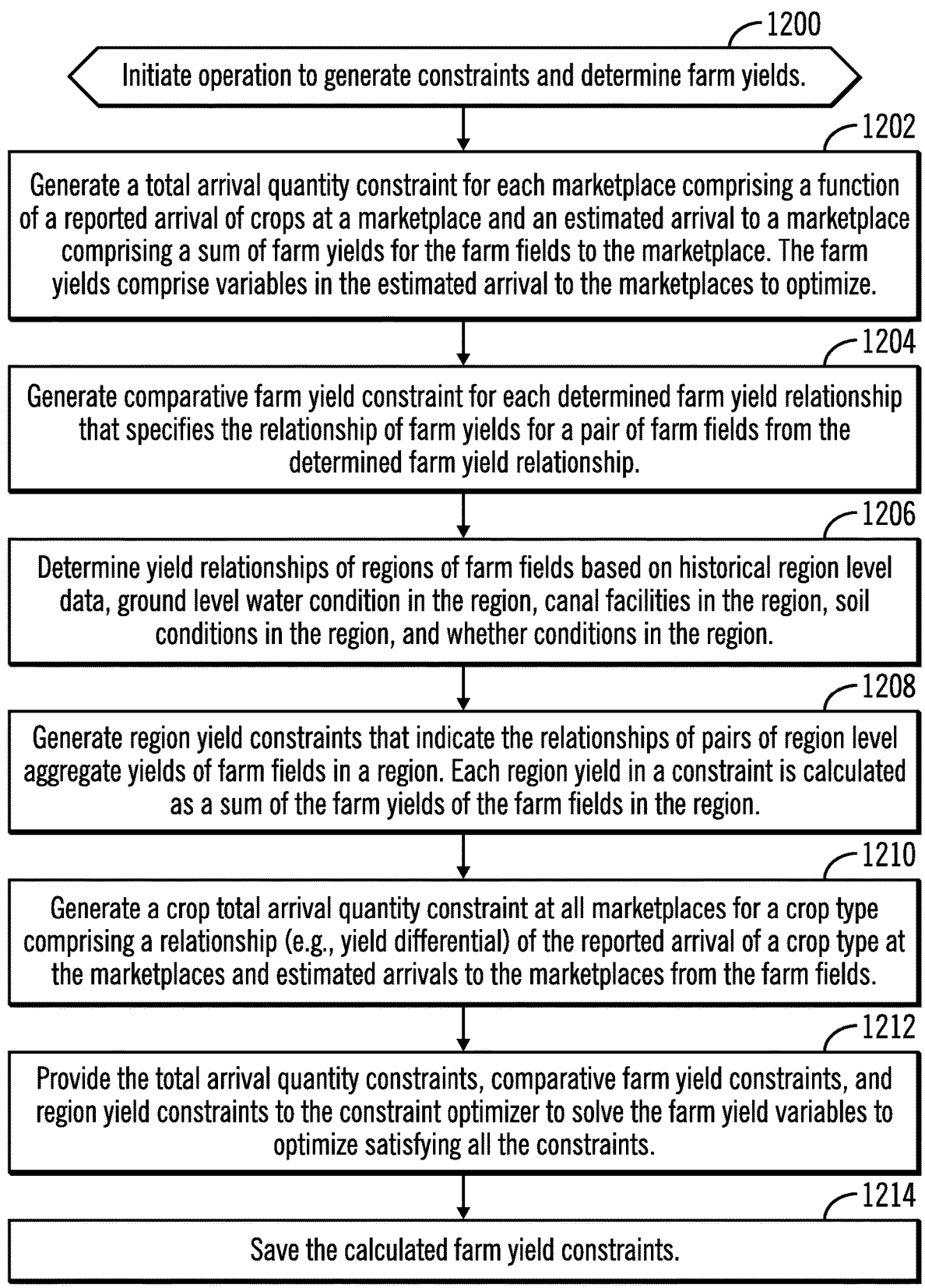
FIG. 12 illustrates an embodiment of operations to generate constraints to use to estimate farm yields that satisfy the constraints.

FIG. 12 illustrates an embodiment of operations performed by the constraint generator 112 and the constraint optimizer 114 to use the gathered information 118, 122, 124 and $300_i$ to generate constraints 126, 128, and 130 based on real time data that the constraint optimizer 114 may use to provide an optimal solution of the farm yields 132 satisfying the generated constraints 126, 128, and 130. Upon initiating (at block 1200) an operation to generate constraints 126, 128, 130 and solve the farm yields, the constraint generator 112 generates (at block 1202) a total arrival quantity constraint 126, such as constraint 900 in FIG. 9, shown for each marketplace comprising a function of a reported arrival of crops at a marketplace 902 and an estimated arrival to a marketplace 904 comprising a sum of farm yields 908 for the farm fields to the marketplace. The farm yields comprise variables in the estimated arrival to the marketplaces to optimize.

The constraint generator 112 may further generate (at block 1204) a comparative farm yield constraint 128, such as constraint in FIG. 6, for each determined farm yield relationship 500i that specifies the relationship of farm yields for a pair of farm fields from the determined farm yield relationship 500i. The constraint generator 112, or other component, may further determine (at block 1206) region relationships, such as shown in FIG. 10, of regions of farm fields based on historical region level data, ground level water condition in the region, canal facilities in the region, soil conditions in the region, and weather conditions in the region. The constraint generator 112 generates (at block 1208) region yield constraints 130 that indicate the relationships of pairs of region level aggregate yields of farm fields in a region. Each region aggregate yield in a constraint is calculated as a sum of the farm yields of the farm fields in the region, such as calculated in equation 904 in FIG. 9, but including all farm fields 406 in a region 402.

The constraint generator 112 may further generate (at block 1210) a crop total arrival quantity constraint 126 for each marketplace comprising a relationship (e.g., yield differential) of the reported arrival of a crop type at the marketplaces and estimated arrivals of the crop type to the marketplaces from the farm fields, such as the constraint 800 shown in FIG. 8. The estimated arrival to a marketplace may comprise an arrival weight (estimated percentage of crops that arrives to the marketplace from the farm fields) times sum of the estimated arrivals to the marketplace. The sum of estimated arrivals to a marketplace is a sum of, for each farm field, the farm yields times the delivery probability the farm field delivers crops to the marketplace.

The constraint generator 112 provides (at block 1212) the total arrival quantity constraints 126, comparative farm yield constraints 128, and region yield constraints 130 to the constraint optimizer 114 to solve the farm yield variables to optimize satisfying all the constraints, such as using quadratic programming or other optimizing solutions. The calculated comparative farm yield constraints 128 may be saved (at block 1214) as field 314 in farm field data $300_i$ for the farm fields and stored in the farm data database 136.

In the embodiment of FIG. 12, all the constraints 126, 128, 130 are provided to the constraint optimizer 114. In alternative embodiments different combinations of one or more constraints 126, 128, 130, including the constraints described with respect to FIGS. 6-10, may be provided to the constraint optimizer 114 to calculate the farm yields.

With the embodiment of FIG. 12, the farm yields may be determined not from historical data, but from current product reported as delivered to marketplaces and based on relationships of farm and regional yields based on other gathered information, such as remote sensed data, e.g., NVDI data, satellite images, weather patterns, soil conditions, water table, etc. In this way, the farm yields, for which data often is not directly available, may be estimated based on reported marketplace crop arrivals, which information is typically real time, accurate and available.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
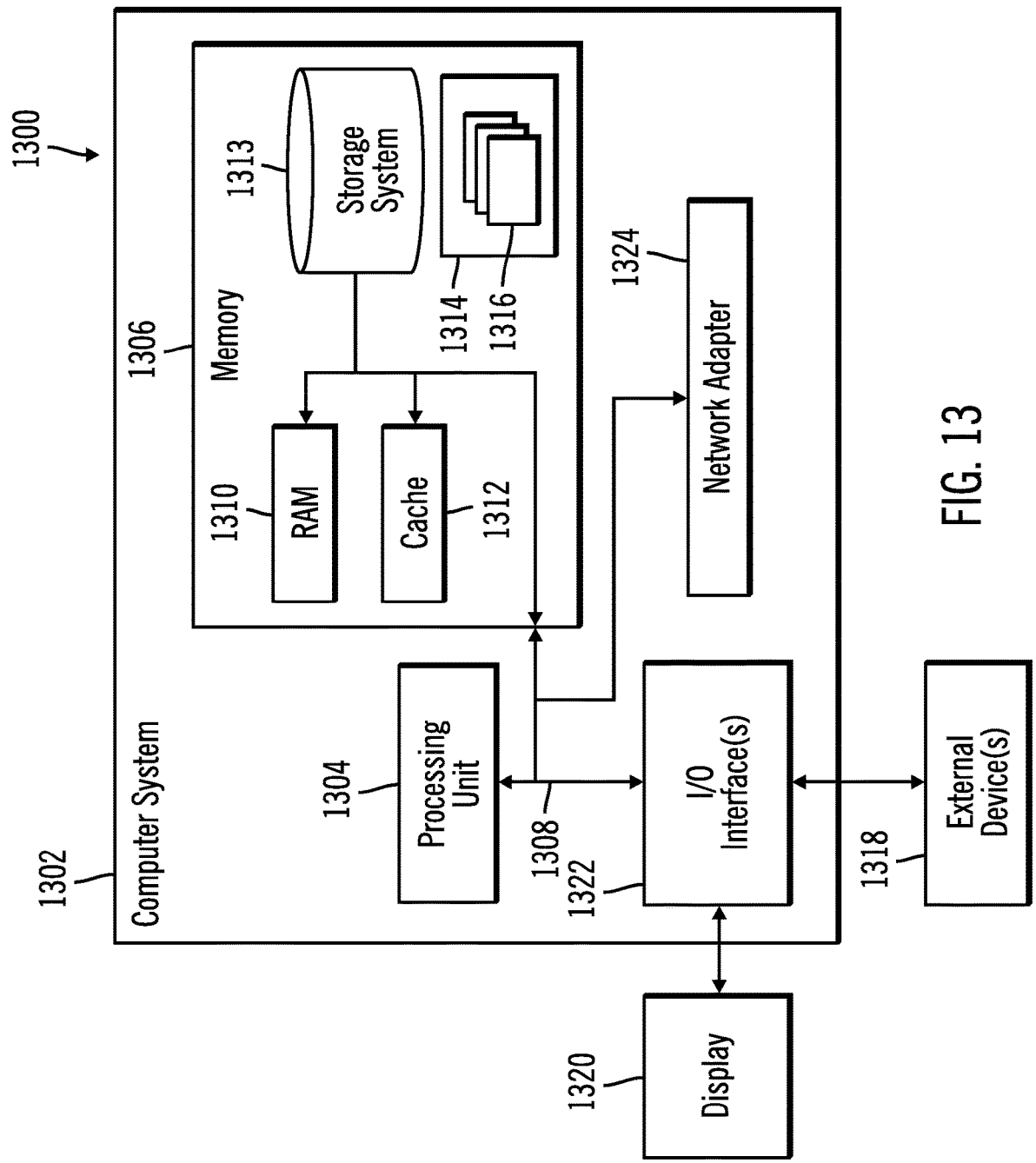
FIG. 13 illustrates an illustrates a computing environment in which the components of FIG. 1 may be implemented.

The computational components of FIG. 1, including the farm yield analysis system 100, may be implemented in one or more computer systems, such as the computer system 1302 shown in FIG. 13. Computer system/server 1302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, the computer system/server 1302 is shown in the form of a general-purpose computing device. The components of computer system/server 1302 may include, but are not limited to, one or more processors or processing units 1304, a system memory 1306, and a bus 1308 that couples various system components including system memory 1306 to processor 1304. Bus 1308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1302 typically includes a variety of computer system readable media. Such media may be any available media that is accessible by computer system/server 1302, and it includes both volatile and non-volatile media, removable and non-removable media.

System memory 1306 can include computer system readable media in the form of volatile memory, such as random access memory (RAM) 1310 and/or cache memory 1312. Computer system/server 1302 may further include other removable/non-removable, volatile/non-volatile computer system storage media. By way of example only, storage system 1313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1308 by one or more data media interfaces. As will be further depicted and described below, memory 1306 may include at least one program product having a set (e.g., at least one) of program modules that are configured to carry out the functions of embodiments of the invention.

Program/utility 1314, having a set (at least one) of program modules 1316, may be stored in memory 1306 by way of example, and not limitation, as well as an operating system, one or more application programs, other program modules, and program data. Each of the operating system, one or more application programs, other program modules, and program data or some combination thereof, may include an implementation of a networking environment. The components of the computer 1302 may be implemented as program modules 1316 which generally carry out the functions and/or methodologies of embodiments of the invention as described herein. The systems of FIG. 1 may be implemented in one or more computer systems 1302, where if they are implemented in multiple computer systems 1302, then the computer systems may communicate over a network.

Computer system/server 1302 may also communicate with one or more external devices 1318 such as a keyboard, a pointing device, a display 1320, etc.; one or more devices that enable a user to interact with computer system/server 1302; and/or any devices (e.g., network card, modem, etc.) that enable computer system/server 1302 to communicate with one or more other computing devices. Such communication can occur via Input/Output (I/O) interfaces 1322. Still yet, computer system/server 1302 can communicate with one or more networks such as a local area network (LAN), a general wide area network (WAN), and/or a public network (e.g., the Internet) via network adapter 1324. As depicted, network adapter 1324 communicates with the other components of computer system/server 1302 via bus 1308. It should be understood that although not shown, other hardware and/or software components could be used in conjunction with computer system/server 1302. Examples, include, but are not limited to: microcode, device drivers, redundant processing units, external disk drive arrays, RAID systems, tape drives, and data archival storage systems, etc.

The letter designators, such as i, j, n are used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining farm yields of farm fields in a geographical region that deliver crops to marketplaces in the geographical region, wherein the computer program product comprises a computer readable storage medium having program instructions embodied therewith that are executed by a processor to cause operations, the operations comprising:
   generating a total arrival quantity constraint for a marketplace comprising a function of a reported arrival of actual crops at a marketplace on a date and an estimated arrival to the marketplace that is a function of farm yield variables for the farm fields, wherein the farm yield variables comprise variables to optimize;
   processing, by a farm size analyzer, a satellite image of the geographical region to determine boundaries and sizes of farm fields in the geographical region;
   processing remote sensed data gathered from measuring how crops reflect light at specific frequencies indicating crop health and stage of growth in the farm fields determined from the satellite image;
   determining farm yield relationships of the farm fields for different pairs of the farm fields, wherein a farm yield relationship compares estimated farm yields of a pair of farm fields with a comparison operator, wherein the estimated farm yields for the pair of farm fields in the farm yield relationships are determined from the crop health and growth stage and the sizes of the farm fields;
   generating comparative farm yield constraints, comprising a function of the farm yield variables to optimize and at least one comparison operator, from the farm yield relationships of the estimated farm yields for different pairs of farms;
   solving a constraint optimization problem based on the total arrival quantity constraint and the comparative farm yield constraints to calculate optimized farm yields of the farm fields from the farm yield variables; and
   storing in a storage the optimized farm yields for the farm fields to provide predicted farm yields based on which farms have been harvested up to a point in time and real time marketplace crop arrivals.

2. The computer program product of claim 1, wherein the total arrival quantity constraint comprises a function of a difference of the reported arrival of crops at the marketplace and the estimated arrival to the marketplace less than a pre-determined yield differential.

3. The computer program product of claim 1, wherein the operations further comprise:
   for each farm field of the farm fields and for each marketplace of a plurality of marketplaces, determining a delivery probability of the farm field delivering at least one crop to the marketplace, wherein the estimated arrival at the marketplace comprises a sum of, for each farm field delivering to the marketplace, a farm yield times the delivery probability for the farm field to deliver to the marketplace.

4. The computer program product of claim 1, wherein the operations further comprise:
   for each farm field of the farm fields and for each marketplace of a plurality of marketplaces, determining a delivery probability of the farm field delivering at least one crop to the marketplace; and
   for each marketplace, determining a marketplace arrival percentage comprising a percentage of crops that arrive at the marketplace from the farm fields delivering crops to the marketplace, wherein the estimated arrival at the marketplace comprises (the marketplace arrival percentage) times (a sum of, for each farm field delivering to the marketplace, a farm yield times the delivery probability for the farm field to the marketplace).

5. The computer program product of claim 1, wherein the total arrival quantity constraint is calculated for each marketplace and each crop type, wherein the reported arrival of crops at a marketplace and the estimated arrival to the marketplace are determined for each crop type.

6. The computer program product of claim 1, wherein a relationship for each comparative farm yield constraint is expressed as a comparison operator between the farm fields or a differential of estimated yields between a pair of farm fields.

7. The computer program product of claim 1, wherein the operations further comprise:
   for each of the farm fields, determining, from the remote sensed data, a crop growth stage;
   for each farm field, determining farm fields within a predetermined distance growing similar crops; and
   for each pair of the determined farm fields within the predetermined distance growing the similar crops, determining a farm yield relationship for the pair of farm yields based on the sizes and growth stages for the pair of farm fields, wherein a comparative farm yield constraint is generated for each determined farm yield relationship to specify a relationship in the farm yield relationship for the farm yields.

8. The computer program product of claim 1, wherein the operations further comprise:
   determining relationships of region aggregate yields for regions, wherein the relationships are determined based on at least one of historical region level data, ground level water condition in the region, canal facilities in the region, soil conditions in the region, and weather conditions in the regions; and
   generating region yield constraints that indicate relationships of pairs of region aggregate yields of farm fields in a region, wherein each region aggregate yield in a constraint is calculated as a sum of the farm yield variables of the farm fields in the region, wherein the solving the constraint optimization problem for the farm yield variables to optimize is based on the total arrival quantity constraint for marketplaces, the comparative farm yield constraints, and the region yield constraints to calculate the optimized farm yields of the farm fields from the farm yield variables.

9. A computer program product for determining farm yields of farm fields in a geographical region that deliver crops to marketplaces in the geographical region, wherein the computer program product comprises a computer readable storage medium having program instructions embodied therewith that are executed by a processor to cause operations, the operations comprising:

processing, by a farm size analyzer, a satellite image of the geographical region to determine boundaries and sizes of farm fields in the geographical region;

processing remote sensed data gathered from measuring how crops reflect light at specific frequencies indicating crop health and stage of growth in the farm fields determined from the satellite image;

generating a crop total arrival quantity to all marketplaces constraint, comprising a function of farm yield variables, based on a relationship of a reported arrival of crops to the marketplaces and estimated arrivals to the marketplaces from the farm fields, wherein the estimated arrivals to the marketplaces are calculated as a sum of estimated arrivals to a marketplace for each of the marketplaces, wherein the sum of estimated arrivals to a marketplace is a function of, for each farm field, a farm yield times a delivery probability the farm field delivers crops to the marketplace;

determining farm yield relationships of the farm fields for different pairs of the farm fields, wherein a farm yield relationship compares estimated farm yields of a pair of farm fields with a comparison operator, wherein the estimated farm yields for the pair of farm fields in the farm yield relationships are determined from the crop health and growth stage and the sizes of the farm fields;

generating comparative farm yield constraints, comprising a function of the farm yield variables to optimize and at least one comparison operator, from the farm yield relationships of the estimated farm yields for different pairs of farms;

solving a constraint optimization problem based on the crop total arrival quantity to all marketplaces constraint and the generated comparative farm yield constraints to calculate optimized farm yields of the farm fields from the farm yield variables; and storing in a storage the optimized farm yields for the farm fields.

10. The computer program product of claim 9, wherein the relationship of the reported arrival of crops to the marketplaces and the estimated arrivals to the marketplaces from the farm fields comprises an estimated differential of an absolute value of a difference of the reported arrival of crops to the marketplaces and the estimated arrivals to the marketplaces from the farm fields.

11. The computer program product of claim 9, wherein the sum of estimated arrivals to a marketplace for each marketplace is multiplied by an arrival weight for the marketplace indicating an estimated percentage of crops that arrives at the marketplace from the farm fields.

12. The computer program product of claim 9, wherein an instance of the crop total arrival quantity to all marketplaces constraint is generated for each crop type from the farm fields.

13. A system comprising:
a processor; and
a computer readable storage medium having program instructions that when executed cause operations, the operations comprising:
generating a total arrival quantity constraint for a marketplace comprising a function of a reported arrival of actual crops at a marketplace on a date and an estimated arrival to the marketplace that is a function of farm yield variables for farm fields, wherein the farm yield variables comprise variables to optimize;

processing, by a farm size analyzer, a satellite image of a geographical region to determine boundaries and sizes of farm fields in the geographical region;

processing remote sensed data gathered from measuring how crops reflect light at specific frequencies indicating crop health and stage of growth in the farm fields determined from the satellite image;

determining farm yield relationships of the farm fields for different pairs of the farm fields, wherein a farm yield relationship compares estimated farm yields of a pair of farm fields with a comparison operator, wherein the estimated farm yields for the pair of farm fields in the farm yield relationships are determined from the crop health and growth stage and the sizes of the farm fields;

generating comparative farm yield constraints, comprising a function of the farm yield variables to optimize and at least one comparison operator, from the farm yield relationships of the estimated farm yields for different pairs of farms;

solving a constraint optimization problem based on the total arrival quantity constraint and the comparative farm yield constraints to calculate optimized farm yields of the farm fields from the farm yield variables; and storing in a storage the optimized farm yields for the farm fields to provide predicted farm yields based on which farms have been harvested up to a point in time and real time marketplace crop arrivals.

14. The system of claim 13, wherein the total arrival quantity constraint comprises a function of a difference of the reported arrival of crops at the marketplace and the estimated arrival to the marketplace less than a pre-determined yield differential.

15. The system of claim 13, wherein the operations further comprise:
for each farm field of the farm fields and for each marketplace of a plurality of marketplaces, determining a delivery probability of the farm field delivering at least one crop to the marketplace, wherein the estimated arrival at the marketplace comprises a sum of, for each farm field delivering to the marketplace, a farm yield times the delivery probability for the farm field to deliver to the marketplace.

16. The system of claim 13, wherein the operations further comprise:
for each of the farm fields, determining, from the remote sensed data, a crop growth stage;
for each farm field, determining farm fields within a predetermined distance growing similar crops; and
for each pair of the determined farm fields within the predetermined distance growing the similar crops, determining a farm yield relationship for the pair of farm yields based on the farm and growth stages for the pair of farm fields, wherein a comparative farm yield constraint is generated for each determined farm yield relationship to specify a relationship in the farm yield relationship for the farm yields.

17. The system of claim 13, wherein the operations further comprise:
determining relationships of region aggregate yields for regions, wherein the relationships are determined based on at least one of historical region level data, ground level water condition in the region, canal facilities in the region, soil conditions in the region, and weather conditions in the regions; and generating region yield constraints that indicate relationships of pairs of region aggregate yields of farm fields in a region, wherein each region aggregate yield in a constraint is calculated as a sum of the farm yield variables of the farm fields in the region, wherein the solving the constraint optimization problem for the farm yield variables to optimize is based on the total arrival quantity constraint for marketplaces, the comparative farm yield constraints, and the region yield constraints to calculate the optimized farm yields of the farm fields from the farm yield variables.

18. A system comprising:

a processor; and a computer readable storage medium having program instructions that when executed cause operations, the operations comprising:

processing, by a farm size analyzer, a satellite image of a geographical region to determine boundaries and sizes of farm fields in the geographical region;

processing remote sensed data gathered from measuring how crops reflect light at specific frequencies indicating crop health and stage of growth in the farm fields determined from the satellite image;

generating a crop total arrival quantity to marketplaces constraint comprising a function of farm yield variables based on a relationship of a reported arrival of crops to the marketplaces and estimated arrivals to the marketplaces from the farm fields, wherein the estimated arrivals to the marketplaces are calculated as a sum of estimated arrivals to a marketplace for each of the marketplaces, wherein the sum of estimated arrivals to a marketplace is a function of, for each farm field, a farm yield times a delivery probability the farm field delivers crops to the marketplace;

determining farm yield relationships of the farm fields for different pairs of the farm fields, wherein a farm yield relationship compares estimated farm yields of a pair of farm fields with a comparison operator, wherein the estimated farm yields for the pair of farm fields in the farm yield relationships are determined from the crop health and growth stage and the sizes of the farm fields;

generating comparative farm yield constraints, comprising a function of the farm yield variables to optimize and at least one comparison operator, from the farm yield relationships of the estimated farm yields for different pairs of farms;

solving a constraint optimization problem based on the crop total arrival quantity to marketplaces constraint and the generated comparative farm yield constraints to calculate optimized farm yields of the farm fields from the farm yield variables; and storing in a storage the optimized farm yields for the farm fields.

19. The system of claim 18, wherein the relationship of the reported arrival of crops to the marketplaces and the estimated arrivals to the marketplaces from the farm fields comprises an estimated differential of an absolute value of a difference of the reported arrival of crops to the marketplaces and the estimated arrivals to the marketplaces from the farm fields.

20. The system of claim 18, wherein the sum of estimated arrivals to a marketplace for each marketplace is multiplied by an arrival weight for the marketplace indicating an estimated percentage of crops that arrives at the marketplace from the farm fields.

21. A computer implemented method performed by a processor executing program code for determining farm yields of farm fields in a geographical region that deliver crops to marketplaces in the geographical region, comprising:

generating a total arrival quantity constraint for a marketplace comprising a function of a reported arrival of actual crops at a marketplace on a date and an estimated arrival to the marketplace that is a function of farm yield variables for the farm fields, wherein the farm yield variables comprise variables to optimize;

processing, by a farm size analyzer, a satellite image of the geographical region to determine boundaries and sizes of farm fields in the geographical region;

processing remote sensed data gathered from measuring how crops reflect light at specific frequencies indicating crop health and stage of growth in the farm fields determined from the satellite image;

determining farm yield relationships of the farm fields for different pairs of the farm fields, wherein a farm yield relationship compares estimated farm yields of a pair of farm fields with a comparison operator, wherein the estimated farm yields for the pair of farm fields in the farm yield relationships are determined from the crop health and growth stage and the sizes of the farm fields;

generating comparative farm yield constraints, comprising a function of the farm yield variables to optimize and at least one comparison operator, from the farm yield relationships of the estimated farm yields for different pairs of farms;

solving a constraint optimization problem based on the total arrival quantity constraint and the comparative farm yield constraints to calculate optimized farm yields of the farm fields from the farm yield variables; and storing in a storage the optimized farm yields for the farm fields to provide predicted farm yields based on which farms have been harvested up to a point in time and real time marketplace crop arrivals.

22. The method of claim 21, wherein the total arrival quantity constraint comprises a function of difference of the reported arrival of crops at the marketplace and the estimated arrival to the marketplace less than a pre-determined yield differential.

23. The method of claim 21, further comprising:

for each farm field of the farm fields and for each marketplace of a plurality of marketplaces, determining a delivery probability of the farm field delivering at least one crop to the marketplace, wherein the estimated arrival at the marketplace comprises a sum of, for each farm field delivering to the marketplace, a farm yield times the delivery probability for the farm field to deliver to the marketplace.

24. The method of claim 21, further comprising:

for each of the farm fields, determining, from the remote sensed data, a crop growth stage;

for each farm field, determining farm fields within a predetermined distance growing similar crops; and for each pair of the determined farm fields within the predetermined distance growing the similar crops, determining a farm yield relationship for the pair of farm yields based on the sizes and growth stages for the pair of farm fields, wherein a comparative farm yield constraint is generated for each determined farm yield relationship to specify a relationship in the farm yield relationship for the farm yields.

25. The method of claim 21, further comprising:

determining relationships of region aggregate yields for regions, wherein the relationships are determined based on at least one of historical region level data, ground level water condition in the region, canal facilities in the region, soil conditions in the region, and weather conditions in the regions; and generating region yield constraints that indicate relationships of pairs of region aggregate yields of farm fields in a region, wherein each region aggregate yield in a constraint is calculated as a sum of the farm yields of the farm fields in the region, wherein the solving the constraint optimization problem for the farm yields to optimize is based on the total arrival quantity constraint for marketplaces, the comparative farm yield constraints, and the region yield constraints to calculate the farm yields of the farm fields.

* * * * *